United States Patent
Li et al.

(10) Patent No.: US 12,427,495 B2
(45) Date of Patent: Sep. 30, 2025

(54) PREPARATION METHOD OF MERCURY REMOVAL MATERIAL

(71) Applicant: CENTRAL SOUTH UNIVERSITY, Changsha (CN)

(72) Inventors: Hailong Li, Changsha (CN); Fanyue Meng, Changsha (CN); Jianping Yang, Changsha (CN); Wenqi Qu, Changsha (CN); Zequn Yang, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 626 days.

(21) Appl. No.: 17/894,173

(22) Filed: Aug. 24, 2022

(65) Prior Publication Data
US 2023/0068024 A1 Mar. 2, 2023

(30) Foreign Application Priority Data
Aug. 25, 2021 (CN) .......................... 202110979784.7

(51) Int. Cl.
| | | |
|---|---|---|
| *B01J 20/04* | (2006.01) | |
| *B01D 53/02* | (2006.01) | |
| *B01J 20/28* | (2006.01) | |
| *B01J 20/30* | (2006.01) | |
| *B01J 20/32* | (2006.01) | |

(52) U.S. Cl.
CPC ............ *B01J 20/045* (2013.01); *B01D 53/02* (2013.01); *B01J 20/28004* (2013.01); *B01J 20/28016* (2013.01); *B01J 20/3021* (2013.01); *B01J 20/3071* (2013.01); *B01J 20/3078* (2013.01); *B01J 20/3085* (2013.01); *B01J 20/3236* (2013.01); *B01D 2257/602* (2013.01); *B01D 2258/0283* (2013.01); *B01J 2220/42* (2013.01); *B01J 2220/4806* (2013.01)

(58) Field of Classification Search
CPC ................ B01J 20/045; B01J 20/28004; B01J 20/28016; B01J 20/3021; B01J 20/3071; B01J 20/3078; B01J 20/3085; B01J 20/3236; B01D 53/02
See application file for complete search history.

(56) References Cited

FOREIGN PATENT DOCUMENTS

CN 109092277 A * 12/2018 ............. B01D 53/02

OTHER PUBLICATIONS

Yang et al., "Fractal characterization of adsorption-pore for mechanically activated sulfide ores", Non-ferrous metals (ore dressing part), (2017), v.2, pp. 60-66. (Dislosed in IDS and provided by Applicant).*
Rashchi et al., Int. J. Miner Process, (2002), v.67, p. 43-58.*
Yang Fuqiang, et al., Fractal characterization of adsorption-pore for mechanically activated sulfide ores, Non- ferrous metals (ore dressing part), 2017, pp. 60-66.
Minamata Convention on Mercury Text and Annexes, United Nations Environment Programme (UNEP), 2019, pp. 3-67.

* cited by examiner

Primary Examiner — Yong L Chu
(74) Attorney, Agent, or Firm — Bayramoglu Law Offices LLC

(57) ABSTRACT

A modified natural sulfide ore material, a preparation method, and a use thereof are disclosed. A natural sulfide ore and a copper salt are used as raw materials. The natural sulfide ore is modified through mechanical grinding for activation, drying, and the like to synthesize a sulfide ore composite. The copper salt is subjected to a reaction to increase metal sites, produce fine microcrystalline particles, and change the crystal structure, such that active sites can be fully exposed. When contacting mercury in a gas phase and/or a liquid phase, the modified natural sulfide ore material can convert the mercury into a stable compound to realize the immobilization and removal of the mercury, which has advantages such as large mercury adsorption capacity, high adsorption rate, wide application temperature range, low cost, abundant raw material reserves, simple operation, and environmentally-friendly mercury removal products without secondary pollution and shows promising industrial application prospects.

13 Claims, 2 Drawing Sheets

PREPARATION METHOD OF MERCURY REMOVAL MATERIAL

CROSS REFERENCE TO THE RELATED APPLICATIONS

This application is based upon and claims priority to Chinese Patent Application No. 202110979784.7, filed on Aug. 25, 2021, the entire contents of which are incorporated herein by reference.

TECHNICAL FIELD

The present disclosure belongs to the technical field of environmental pollution control and purification, and in particular, relates to a preparation method of a mercury removal material.

BACKGROUND

Mercury (Hg) is the only metal in nature that exists in a liquid state at room temperature. Mercury and compounds thereof are highly toxic, persistent, highly corrosive, volatile, globally migratory and diffusive, bioaccumulative, and hazardous to human health and the surrounding environment. Mercury emission sources can be divided into natural sources and man-made sources. Mercury of the man-made sources mainly comes from the discharge of waste gas, wastewater, and waste residues in industries, such as metal smelting, coal-fired power plants, petrochemicals, garbage disposal, and cement production. In 2013, the United Nations Environment Programme (UNEP) formulated the "*Minamata Convention on Mercury*", which aims to control mercury emissions globally. In 2017, the "*Minamata Convention on Mercury*" officially entered into force in more than 100 countries worldwide, which demonstrates that the reduction of mercury pollutant emissions has become a mission of the international community.

Currently, common mercury removal methods include adsorption, catalytic oxidation, absorption, ion exchange, low-temperature separation, and the like, among which the adsorption is the most widely used method. Activated carbon is a relatively developed commercial mercury removal agent and has been used in the field of mercury removal from a coal flue gas. However, the activated carbon is heavily affected by working conditions and is not suitable in high temperatures, high acidity, high humidity, and high $SO_2$ concentration environments. In addition, the activated carbon needs to be used in a large amount, cannot be regenerated, and involves a high operating cost, which makes the activated carbon not suitable for large-scale applications.

In recent years, fly ash, zeolite materials, calcium-based materials, precious metals, metal sulfides, and the like have all been tried for the immobilization and removal of mercury. The metal sulfides can immobilize Hg as stable compounds (HgS) because the surface of the metal sulfides is enriched with many chemical groups that can spontaneously react with mercury at a low temperature (such as surface elemental sulfur, polysulfide chains, and metal active sites) and can exhibit superior mercury removal efficiency. Therefore, the metal sulfides are considered to be the most favorable substitutes for traditional activated carbon-based adsorbents. However, a synthesis process of a metal sulfide adsorbent with high mercury removal efficiency is complicated, requires a complex precursor and an addition of a surfactant, and needs to be strictly and accurately controlled, which significantly increases the difficulty and cost and hinders the large-scale production and application of the metal sulfide adsorbents.

Natural metal sulfide ores are rich in sulfur sites and metal sites. During an ore formation process, there is also a phenomenon of isomorphous substitution, which causes a change in a unit cell structure to produce electron cores or hole cores. These may collectively have a positive effect on mercury removal. However, due to the compact structure, small surface area, and large particle size, most of the natural metal sulfide ores have active sites that cannot be exposed and thus do not have the mercury removal ability. Therefore, a mercury removal effect of a natural metal sulfide ore can be improved by modifying the natural metal sulfide ore to reduce the microcrystalline particle size and change the crystal structure, such that active sites are increased or active sites can be fully exposed, which enables the large-scale application of the metal sulfide adsorbents in the field of mercury removal.

SUMMARY

To overcome the defects and deficiencies of existing mercury removal materials, the present disclosure provides a preparation method for a modified natural sulfide ore material. In the present disclosure, a copper salt is subjected to a reaction on the surface of a sulfide ore to increase metal sites, produce fine microcrystalline particles under the action of a mechanical force, and change the crystal structure, such that active sites can be fully exposed. A grinding and drying process can be adopted to strengthen the mass transfer among materials and promote the reaction.

The present disclosure adopts the following technical solutions.

The present disclosure provides a modified natural sulfide ore material, which can convert mercury into a stable compound to achieve the immobilization and removal of the mercury. The modified natural sulfide ore material is prepared by mixing a natural sulfide ore with a copper salt and subjecting the resulting mixture to mechanical ball-milling for activation and drying.

In the present disclosure, preferably, in the natural sulfide ore, a mass fraction of sulfur may be higher than or equal to 10%.

Preferably, the natural sulfide ore may be one or a combination of two or more selected from the group consisting of chalcopyrite, chalcocite, bornite, tetrahedrite, galena, sphalerite, marmatite, pyrite, pyrrhotite, molybdenite, and stibnite.

The copper salt may be one or a combination of two or more selected from the group consisting of cuprous chloride, cupric chloride, and a hydrate thereof.

The inventors discovered that, during a mechanical grinding process, the mechanical energy is converted into the energy required for a chemical reaction. Under mechanical grinding at room temperature, the natural sulfide ore can react with the copper salt to generate a novel composite with a prominent mercury removal effect that is composed of a cupric sulfide metal compound and a chloride (reaction equation: formula 1-1). That is, the original crystal structure of the natural sulfide ore is destroyed, and the natural sulfide ore is converted into a complex composed of a cupric sulfide metal compound and a chloride, which is the sulfide ore composite.

MeS (natural sulfide ore)+$CuCl_2$/CuCl→CuS+CuSmCln (formula 1-1)

Preferably, the mass ratio of the copper salt to the natural sulfide ore may be 1:20 to 2:1.

Preferably, the natural sulfide ore may be subjected to a ball-milling treatment.

Preferably, the natural sulfide ore may be washed with dilute acid for impurity removal before being subjected to the ball-milling treatment.

In the present disclosure, the modified natural sulfide ore material may be prepared through the following process: (1) washing the natural sulfide ore with dilute acid to remove an oxide film and impurities on a surface, and washing the natural sulfide ore with water; drying or short-time calcining and crushing the natural sulfide ore; and subjecting the crushed natural sulfide ore to ball-milling in a ball mill; (2) adding the copper salt at a specified amount to the ball mill, conducting mechanical grinding for activation, and drying or lyophilizing a ground material in a vacuum-drying oven; and (3) further conducting mechanical grinding and sieving the ground material.

The present disclosure also provides a preparation method for the modified natural sulfide ore material, including mixing a natural sulfide ore with a copper salt, and subjecting the resulting mixture to mechanical ball-milling for activation and drying to obtain the modified natural sulfide ore material, where the preparation method specifically includes the following steps: (1) washing the natural sulfide ore with dilute acid to remove an oxide film and impurities on a surface, and washing the natural sulfide ore with water; drying or calcining and crushing the natural sulfide ore; and subjecting the crushed natural sulfide ore to ball-milling in a ball mill; (2) adding the copper salt at a specified amount to the ball mill, conducting mechanical grinding for activation, and drying or lyophilizing a ground material in a vacuum-drying oven; and (3) further conducting mechanical grinding and sieving the ground material.

Preferably, in step (1), the dilute acid may have a concentration of 1 wt % to 5 wt % and may be one selected from the group consisting of sulfuric acid, hydrochloric acid, nitric acid, and acetic acid. The washing may be conducted by soaking the natural sulfide ore in the dilute acid for 5 min to 20 min. The drying may be conducted at 100° C. to 200° C. The calcining may be conducted at 400° C. to 700° C. The ball-milling may be conducted for 5 min to 30 min.

In step (2), the mass ratio of the copper salt to the natural sulfide ore may be 1:20 to 2:1. The mechanical grinding may be conducted at 25° C. to 75° C. for 5 min to 60 min. The vacuum-drying may be conducted at 60° C. to 150° C., and the lyophilizing may be conducted at −20° C. to −40° C.

In step (3), further grinding may be conducted for 5 min to 20 min, and the sieving may be conducted until the particle size is 74 μm or less.

The present disclosure further provides a use of the modified natural sulfide ore material as a mercury removal agent in the field of mercury removal, where the modified natural sulfide ore material is directly injected into a flue pipe, a mercury removal tower, a fluidized bed, or a wet flue gas purification system, or loaded on a carrier, or used as a molding material in a fixed bed system.

Active groups on a surface of metal sulfides can spontaneously react with mercury at room temperature to convert the mercury into a stable compound, thereby immobilizing the mercury on the adsorbent. Metal sulfides are considered one of the most promising mercury removal materials. Currently, many metal sulfide mercury removal agents are generally obtained through chemical synthesis, where a preparation process is complicated, requires a complex precursor and an addition of a surfactant, and needs to be strictly and accurately controlled, which increases the cost and restricts the use of metal sulfide materials in the field of mercury removal. Natural metal sulfide ores, such as chalcopyrite, chalcocite, galena, and pyrite, have abundant reserves. However, natural metal sulfide ores are generally massive aggregates, are coated with an oxide film on a surface, have a large particle size, compact structure, small specific surface area (SSA), and complicated composition, and are wrapped and accompanied by gangue, which results in that chemically active groups cannot be exposed and there is no mercury removal ability. Natural metal sulfide ores are rich in sulfur sites, metal sites, and lattice oxygen sites, and there is a phenomenon of isomorphous substitution during an ore formation process that causes a change in a unit cell structure to produce electron cores or hole cores. In the present disclosure, a natural sulfide ore and a copper salt are used as raw materials, and the natural sulfide ore is modified through mechanical grinding for activation, drying or calcination, and the like to synthesize a modified natural sulfide ore material, which can be used as a mercury adsorbent for the immobilization and removal of mercury. The dilute acid treatment removes the oxide film and impurities on the surface of the natural sulfide ore. During a drying or short-time calcination process, a part of the sulfur escapes and the remaining sulfur sites are exposed, such that the natural sulfide ore is more likely to contact and react with the copper salt. The copper salt is subjected to a reaction on the surface of the sulfide ore to increase metal sites, produce fine microcrystalline particles (new material) under the action of a mechanical force, and change the crystal structure, such that active sites can be fully exposed. The grinding and drying process can strengthen the mass transfer among the materials and promote the reaction. That is, the added copper salt participates in the reaction to generate the modified natural sulfide ore material, where the original crystal structure of the sulfide ore is destroyed. The modified natural sulfide ore material is a composite composed of a cupric sulfide metal compound and a chloride, and this composite is a key for mercury removal. In addition, in the preparation process of the present disclosure, a dilute acid is used to destroy an oxide film on the surface of the sulfide ore and dissolve some gangue impurities, such that increased active sites of the sulfide ore are exposed, which is favorable for the grinding modification treatment by the copper salt subsequently added.

Due to the chemical compositions and structural characteristics of natural metal sulfide ores, the present disclosure uses a natural sulfide ore and a copper salt as raw materials to synthesize a modified natural sulfide ore material through mechanical grinding for activation, drying, and the like, which can be used as a mercury adsorbent for the immobilization and removal of mercury. The copper salt is subjected to a reaction on the surface of the sulfide ore to increase metal sites, produce fine microcrystalline particles under the action of a mechanical force, and change the crystal structure (as shown in FIGS. 1A and 1B), such that active sites can be fully exposed, and the grinding and drying process can strengthen the mass transfer among materials and promote the reaction.

The present disclosure further has the following advantages: During the preparation process of the present disclosure, the grinding is conducted at least three times. During the first time, the crushed natural sulfide ore is subjected to thorough ball-milling in a ball mill. During the second time, a specified amount of the copper salt is added to the ball mill, and the mechanical grinding is further conducted for activation. During the third time, the grinding is performed after the drying step. The first grinding is conducted for crushing; the second grinding is conducted to provide the energy required for a solid-solid reaction to destroy the crystal structure to generate a new material (the mechanical energy is converted into thermal energy and internal energy); the third grinding is conducted also for crushing and can reduce agglomeration after drying.

Compared with the prior art, the technical solutions of the present disclosure have the following advantages:

(1) The modified natural sulfide ore material synthesized by the method of the present disclosure can contact mercury in a gas phase and/or a liquid phase and convert the mercury into a stable compound to realize the immobilization and removal of the mercury. The modified natural sulfide ore material has advantages, such as large mercury adsorption capacity, high adsorption rate, and wide application temperature range. The method of the present disclosure is simple and greatly improves the mercury removal performance of the natural sulfide ore. After the natural sulfide ore is modified, the saturated mercury removal capacity exceeds 80 mg/g and can be up to 357 mg/g, and the saturated mercury removal capacity and mercury removal rate are dozens or even thousands of times higher than those before the modification.

(2) The raw material (natural sulfide ore) of the present disclosure has huge and abundant reserves and is easy to acquire, and thus the present disclosure significantly reduces the cost compared with the chemical synthesis of a sulfide mercury removal agent.

(3) The preparation process of the present disclosure leads to no wastewater and waste residue and involves a small consumption of water and raw materials, which avoids environmental pollution during chemical synthesis.

(4) The present disclosure overcomes the shortcomings of the traditional impregnation method, such as low loading efficiency, poor modification effect, complicated process, large water consumption, large time consumption, high-temperature drying, and high energy consumption.

(5) Sulfide ore mercury removal materials suitable for different working conditions can be prepared by controlling a modification process, which leads to a wide application temperature range and a promising industrial application prospect.

(6) Mercury can be immobilized on the modified sulfide ore in the form of a stable compound, which is environmentally friendly, can effectively avoid the secondary release of mercury, and has huge environmental benefits.

DETAILED DESCRIPTION OF THE EMBODIMENTS

Figure 1A:
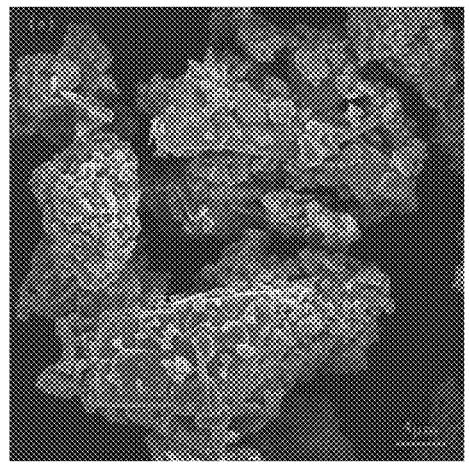
FIGS. 1A and 1B show a natural ore without modification and a mechanochemically-modified ore.
Figure 1B:
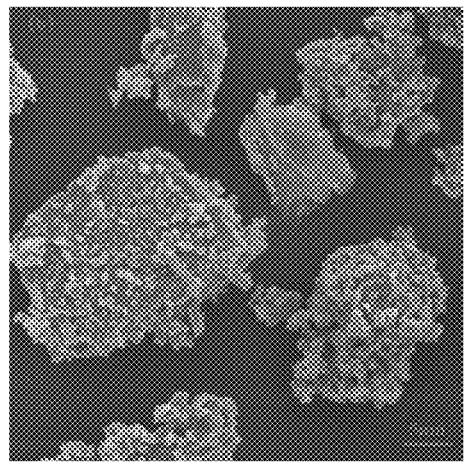

To make the objective, technical solutions, and advantages of the present disclosure more comprehensible, the present disclosure will be further described below in detail below with reference to the examples. It should be understood that the specific examples described herein are merely intended to explain the present disclosure, rather than to limit the present disclosure.

Further, the technical features involved in the various embodiments of the present disclosure described below may be combined as long as they do not constitute a conflict with each other.

Example 1

Chalcopyrite (S: 30 wB %) was soaked in 4 wt % dilute hydrochloric acid for 10 min, dried at 150° C. for 3 h, crushed with a crushing machine, and ball-milled in a ball mill for 5 min. Cuprous chloride and milled chalcopyrite were mixed in a mass ratio of 3:2, mechanically ground at 50° C. for 20 min in a ball mill to allow activation, and vacuum-dried at 100° C. for 8 h. The dried material was further ground for 10 min and sieved until the particle size was 74 µm or less to obtain a modified ore material.

300 mg of the modified ore material was weighed and placed in a simulated flue gas scrubbing device, where a simulated scrubbing solution had a temperature of 25° C., a pH of 4, and a volume of 200 mL. A mercury permeation tube was used to produce elemental mercury. A VM-3000 mercury analyzer was used to determine a mercury concentration in real-time. A mass flow meter was used to accurately control the gas flow rate of each component to simulate a composition of flue gas. A total gas flow rate was 0.5 L/min, an initial $Hg^0$ concentration was 200 f 2 µg/m³, and in a pure $N_2$ atmosphere, an $Hg^0$ removal rate of the modified natural sulfide ore material within 1 h was 94.8%.

Example 2

Molybdenite (S: 55 wB %) was soaked in 2 wt % dilute sulfuric acid for 20 min, dried at 120° C. for 6 h, crushed with a crushing machine, and ball-milled in a ball mill for 20 min. Cupric chloride and milled molybdenite were mixed in a mass ratio of 1:2, mechanically ground at 75° C. for 30 min in a ball mill to allow activation, and vacuum-dried at 120° C. for 12 h. The dried material was further ground for 20 min and sieved until the particle size was 74 µm or less to obtain a modified ore material.

75 mg of the modified ore material was weighed and injected into a pilot-scale jet tower with a volume of 1 m³. A mercury generator was used to produce elemental mercury. A VM-3000 mercury analyzer was used to determine a mercury concentration in real-time. A flue gas flow valve was used to control a gas flow rate. An initial $Hg^0$ concentration was 100 µg/m³, a flue gas flow rate was 1 m³/min, a temperature was 125° C., and in a pure $N_2$ atmosphere, an $Hg^0$ removal rate within 1 h was 97.2%.

Example 3

Chalcocite (S: 15 wB %) was soaked in 3 wt % dilute sulfuric acid for 10 min, dried at 100° C. for 8 h, crushed with a crushing machine, and ball-milled in a ball mill for 10 min. Cupric chloride and milled chalcocite were mixed in a mass ratio of 3:4, mechanically ground at 40° C. for 25 min in a ball mill to allow activation, and lyophilized at −35° C. for 6 h. The dried material was further ground for 15 min and sieved until the particle size was 74 µm or less to obtain a modified ore material. Clay was added to the modified ore material, and the resulting mixture was extruded into 2 mm to 3 mm pellets.

80 mg of the pellets were weighed and placed in a simulated fixed-bed reactor. A mercury permeation tube was used to produce elemental mercury. A VM-3000 mercury analyzer was used to determine a mercury concentration in real-time, and a mass flow meter was used to accurately control the gas flow rate of each component to simulate a composition of flue gas.

The total gas flow rate was 1 L/min, the initial $Hg^0$ concentration was 65±1 μg/m$^3$, and the reaction temperature was 100° C. In a pure $N_2$ atmosphere, an $Hg^0$ removal rate was 98.2%. In a $N_2$+500 ppm $SO_2$ atmosphere, an $Hg^0$ removal rate was 96.5%. In a $N_2$+8% $H_2O$+500 ppm $SO_2$ atmosphere, an $Hg^0$ removal rate within 2 h was 94.1%.

Example 4

Chalcopyrite (S: 30 wB %) was soaked in 2 wt % dilute sulfuric acid for 15 min, dried at 100° C. for 8 h, crushed with a crushing machine, and ball-milled in a ball mill for 15 min. Cupric chloride and milled chalcopyrite were mixed in a mass ratio of ratio 2:3, mechanically ground at 50° C. for 30 min in a ball mill to allow activation, and vacuum-dried at 120° C. for 6 h. The dried material was further ground for 15 min and sieved until the particle size was 74 μm or less to obtain a modified ore material.

25 mg of the modified ore material was weighed and placed in a simulated fixed-bed reactor. A mercury permeation tube was used to produce elemental mercury. A VM-3000 mercury analyzer was used to determine a mercury concentration in real-time. A mass flow meter was used to accurately control the gas flow rate of each component to simulate the composition of flue gas. The total gas flow rate was 1 L/min, the initial $Hg^0$ concentration was 500 f 2 μg/m$^3$, and the reaction temperature was 100° C. In a pure $N_2$ atmosphere, an $Hg^0$ removal rate was 95.2%. In a $N_2$+200 ppm $SO_2$ atmosphere, an $Hg^0$ removal rate within 4 h was 92.5%. In a pure $N_2$ atmosphere, a saturated mercury removal capacity was 83.5 mg/g.

Example 5

Pyrite (S: 51 wB %) was soaked in 2 wt % dilute sulfuric acid for 20 min, calcined at 500° C. for 1 h, crushed with a crushing machine, and ball-milled in a ball mill for 30 min. Cupric chloride and milled pyrite were mixed in a mass ratio of 1:1, mechanically ground at 50° C. for 30 min in a ball mill to allow activation, and vacuum-dried at 105° C. for 10 h. The dried material was further ground for 15 min and sieved until the particle size was 74 μm or less to obtain a modified ore material.

50 mg of the modified ore material was weighed and placed in a simulated fixed-bed reactor. A mercury permeation tube was used to produce elemental mercury. A VM-3000 mercury analyzer was used to determine a mercury concentration in real-time. A mass flow meter was used to accurately control the gas flow rate of each component to simulate a composition of flue gas. A total gas flow rate was 1 L/min, an initial $Hg^0$ concentration was 1,000 f 2 μg/m$^3$, and a reaction temperature was 75° C. In a pure $N_2$ atmosphere, an $Hg^0$ removal rate after 4 h was 100%; in a pure $N_2$ atmosphere, a saturated mercury removal capacity was 357 mg/g.

Example 6

Molybdenite (S: 55 wB %) was soaked in 2 wt % dilute sulfuric acid for 20 min, calcined at 550° C. for 30 min, crushed with a crushing machine, and ball-milled in a ball mill for 20 min. Cupric chloride and milled molybdenite were mixed in a mass ratio of 1:1, mechanically ground at 75° C. for 30 min in a ball mill to allow activation, and vacuum-dried at 100° C. for 12 h. The dried material was further ground for 20 min and sieved until the particle size was 74 μm or less to obtain a modified ore material.

20 mg of the modified ore material was weighed and placed in a simulated fixed-bed reactor. A mercury permeation tube was used to produce elemental mercury, a VM-3000 mercury analyzer was used to determine a mercury concentration in real-time, and a mass flow meter was used to accurately control the gas flow rate of each component to simulate a composition of flue gas. A total gas flow rate was 1 L/min, an initial $Hg^0$ concentration was 2000±5 μg/m$^3$, and a reaction temperature was 75° C. In a pure $N_2$ atmosphere, an $Hg^0$ removal rate after 1 h was 100%.

Example 7

A pilot-scale experiment was conducted in a power plant with a flue gas flow rate of 6,000 m$^3$/min and a mercury concentration of 0.31 mg/m$^3$ to 0.36 mg/m$^3$. The modified natural ore material obtained in Example 4 was injected upstream of a wet desulfurization device (temperature: about 100° C.) at an injection amount of 120 mg/m$^3$ and a removal rate of mercury from flue gas was 95% or higher.

Comparative Example 1

300 mg of the unmodified chalcopyrite in Example 1 was weighed and placed in a simulated flue gas scrubbing device, where a simulated scrubbing solution had a temperature of 25° C., pH of 4, and volume of 200 mL. A mercury permeation tube was used to produce elemental mercury, a VM-3000 mercury analyzer was used to determine a mercury concentration in real-time, and a mass flow meter was used to accurately control the gas flow rate of each component to simulate a composition of flue gas. A total gas flow rate was 0.5 L/min, an initial $Hg^0$ concentration was 200±2 μg/m$^3$, and in a pure $N_2$ atmosphere, an $Hg^0$ removal rate of the modified natural sulfide ore material within 1 h was 3.2%.

Comparative Example 2

The molybdenite in Example 2 was soaked in 2 wt % dilute sulfuric acid for 20 min, dried at 120° C. for 6 h, crushed with a crushing machine, and ball-milled in a ball mill for 20 min.

75 mg of the milled molybdenite was weighed and injected into a pilot-scale jet tower with a volume of 1 m$^3$. A mercury generator was used to produce elemental mercury, a VM-3000 mercury analyzer was used to determine a mercury concentration in real-time, and a flue gas flow valve was used to control a gas flow rate. An initial $Hg^0$ concentration was 100 μg/m$^3$, a flue gas flow rate was 1 m$^3$/min, a temperature was 125° C., and in a pure $N_2$ atmosphere, an $Hg^0$ removal rate within 1 h was 5.6%.

Comparative Example 3

The molybdenite in Example 2 was soaked in 2 wt % dilute sulfuric acid for 20 min, dried at 120° C. for 6 h, crushed with a crushing machine, and ball-milled in a ball mill for 20 min. Cupric chloride and molybdenite were simply mixed in a mass ratio of 1:2 to obtain a mixture.

75 mg of the mixture was weighed and injected into a pilot-scale jet tower with a volume of 1 mi. A mercury generator was used to produce elemental mercury, a VM-3000 mercury analyzer was used to determine a mercury concentration in real-time, and a flue gas flow valve was used to control a gas flow rate. An initial $Hg^0$ concentration was 100 μg/m$^3$, a flue gas flow rate was 1 m$^3$/min, a temperature was 125° C., and in a pure $N_2$ atmosphere, an $Hg^0$ removal rate within 1 h was 7.4%.

Application Example 8

Figure 2:
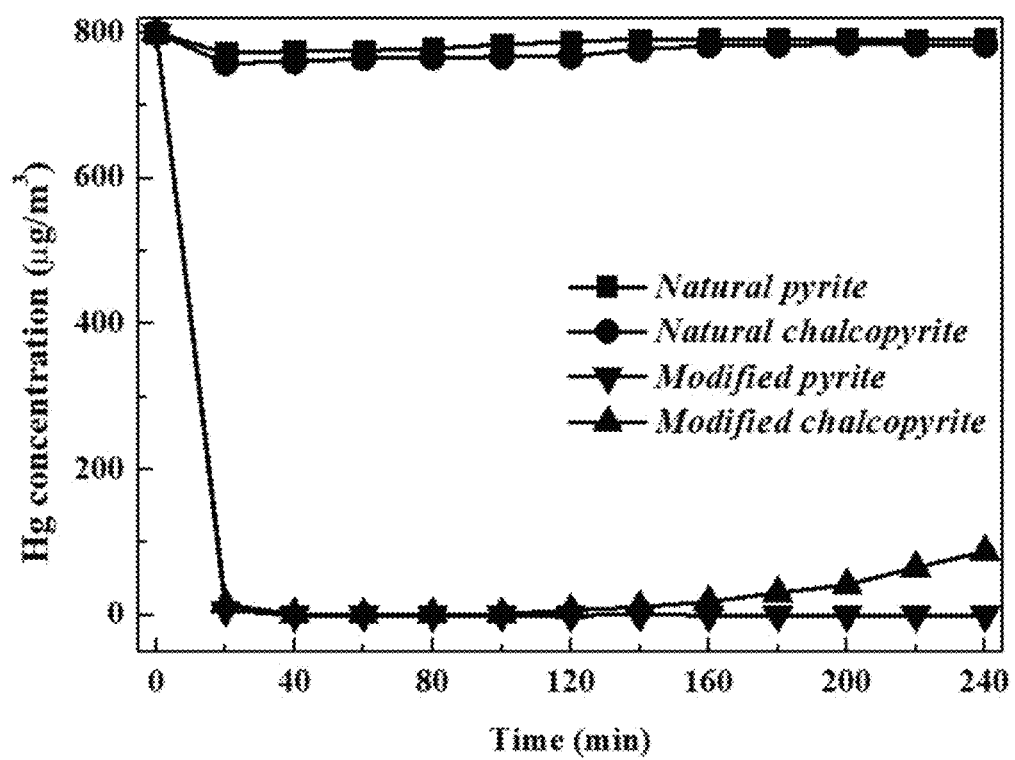
FIG. 2 shows the comparison of mercury removal performance of the natural pyrite and natural chalcopyrite with the mechanochemically-modified pyrite and mechanochemically-modified chalcopyrite in Application Example 8.

25 mg of each of natural pyrite, natural chalcopyrite, the mechanochemically-modified pyrite prepared in Example 5, and the mechanochemically-modified pyrite prepared in Example 1 were weighed and placed in a simulated fixed-bed reactor. A mercury permeation tube was used to produce elemental mercury, a VM-3000 mercury analyzer was used to determine a mercury concentration in real-time, and a mass flow meter was used to accurately control the gas flow rate of each component to simulate a composition of flue gas. A total gas flow rate was 1 L/min, pure nitrogen was adopted as a reaction atmosphere, an initial $Hg^0$ concentration was 800±2 μg/m$^3$, and a reaction temperature was 90° C. Mercury removal effects were shown in FIG. 2.

After the mechanochemical modification, the mercury removal abilities of the pyrite and chalcopyrite were increased by hundreds or even thousands of times.

Application Example 9

Pyrite (S: 51 wB %) was soaked in 2 wt % dilute sulfuric acid for 20 min, dried at 100° C. for 8 h, crushed with a crushing machine, and ball-milled in a ball mill for 30 min. Cupric chloride and milled pyrite were mixed in a mass ratio of 3:2, mechanically ground at 50° C. for 30 min in a ball mill to allow activation, and vacuum-dried at 105° C. for 10 h. The dried material was further ground for 15 min and sieved until the particle size was 74 μm or less to obtain a mechanochemically-modified ore material.

Pyrite (S: 51 wB %) was soaked in 2 wt % dilute sulfuric acid for 20 min and then dried at 100° C. for 8 h; and cupric chloride and the pyrite were simply mixed in a mass ratio of 2:3, then vacuum-dried at 105° C. for 10 h, and sieved until a particle size was 74 μm or less to obtain a simple-mixing-modified ore material.

Pyrite (S: 51 wB %) was soaked in 2 wt % dilute sulfuric acid for 20 min and then dried at 100° C. for 8 h. Cupric chloride was weighed according to a cupric chloride-to-pyrite mass ratio of 2:3 and prepared into a cupric chloride impregnation solution. The pyrite was added to the cupric chloride impregnation solution, and the resulting mixture was stirred for 24 h and then centrifuged. The resulting solid was vacuum-dried at 105° C. for 10 h and sieved until the particle size was 74 μm or less to obtain an impregnation-modified ore material.

Figure 3:
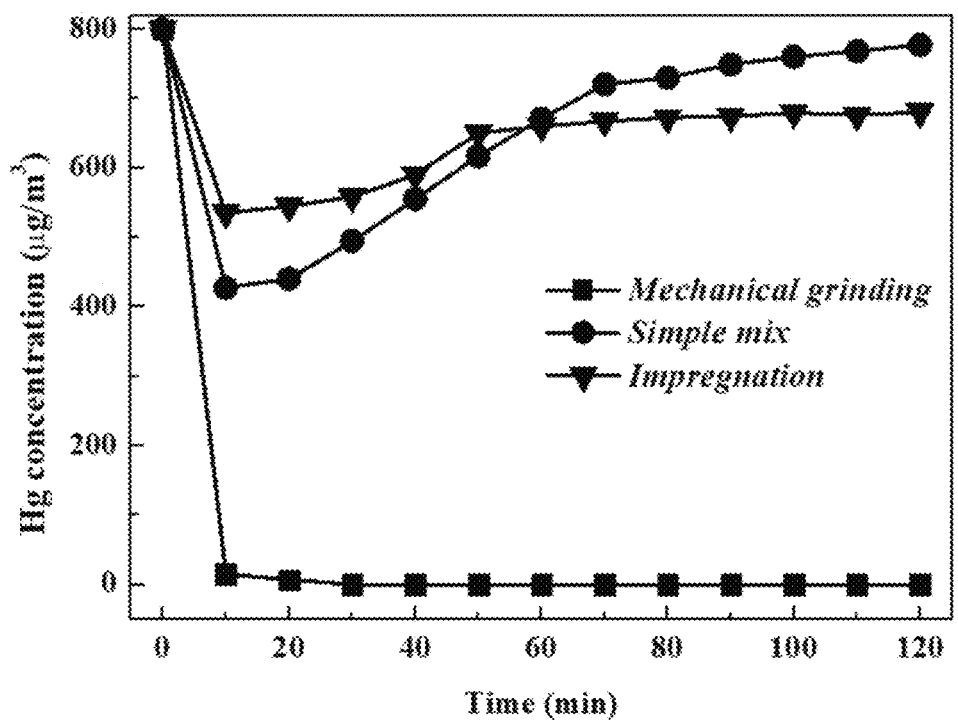
FIG. 3 shows the influence of mechanochemical modification, simple mixing of a natural sulfide and $CuCl_2$, and impregnation on the mercury removal performance of the natural ore material in Application example 9.

25 mg of each of the mechanochemically-modified ore material, the simple-mixing-modified ore material, and the impregnation-modified ore material prepared in this example were weighed and placed in a simulated fixed-bed reactor. A mercury permeation tube was used to produce elemental mercury, a VM-3000 mercury analyzer was used to determine a mercury concentration in real-time, and a mass flow meter was used to accurately control the gas flow rate of each component to simulate a composition of flue gas. The total gas flow rate was 1 L/min, pure nitrogen was adopted as the reaction atmosphere, the initial $Hg^0$ concentration was 800 f 2 μg/m$^3$, and the reaction temperature was 110° C. Mercury removal effects were shown in FIG. 3. The mercury removal performance of the mechanochemically-modified ore material was much higher than that of the simple-mixing-modified ore material and the impregnation-modified ore material.

Application Example 10

Chalcocite (S: 18 wB %) was soaked in 2 wt % dilute sulfuric acid for 20 min, dried at 100° C. for 8 h, crushed with a crushing machine, and ball-milled in a ball mill for 30 min. Cupric chloride and milled pyrite were mixed in a mass ratio of 3:4, mechanically ground at 50° C. for 20 min in a ball mill to allow activation, and vacuum-dried at 105° C. for 6 h. The dried material was further ground for 15 min and sieved until the particle size was 74 μm or less to obtain a mechanochemically-modified ore material.

Figure 4:
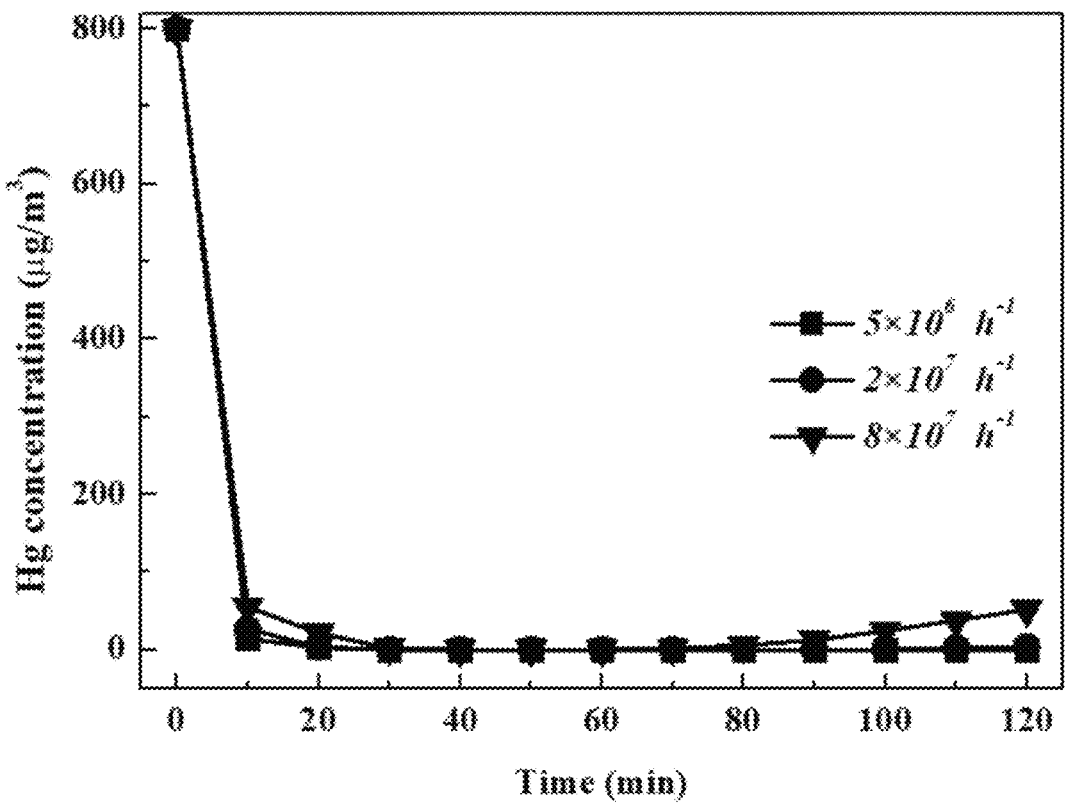
FIG. 4 shows the influence of different superficial velocities on the mercury removal performance of mechanically-modified molybdenite in Application Example 10.

The mechanochemically-modified chalcocite obtained was placed in a simulated fixed-bed reactor. A mercury permeation tube was used to produce elemental mercury, a VM-3000 mercury analyzer was used to determine a mercury concentration in real-time, and a mass flow meter was used to accurately control the gas flow rate of each component to simulate a composition of flue gas. Pure nitrogen was adopted as the reaction atmosphere, the initial $Hg^0$ concentration was 800±2 μg/m$^3$, and the reaction temperature was 60° C. Mercury removal effects at different superficial velocities (gaseous hourly space velocity (GHSV)) were shown in FIG. 4. The superficial velocity in the experiment was thousands of times higher than the actual superficial velocity in industrial application, indicating that the mechanochemically-modified ore material still has an excellent mercury removal effect under extremely-harsh conditions.

What is claimed is:

1. A method of preparing a mercury removal material, comprising: subjecting a natural sulfide ore to a ball-milling treatment, mixing a natural sulfide ore and a copper salt, and subjecting a resulting mixture to a mechanical ball-milling for an activation and a drying to obtain a modified natural sulfide ore material, wherein
    the natural sulfide ore is at least one selected from the group consisting of a chalcopyrite, a chalcocite, a pyrite, a pyrrhotite, and a molybdenite.

2. The method according to claim 1, wherein in the natural sulfide ore, a mass fraction of a sulfur is higher than or equal to 10%.

3. The method according to claim 1, wherein the copper salt is at least one selected from the group consisting of cuprous chloride, cupric chloride, a hydrate of the cuprous chloride, and a hydrate of the cupric chloride.

4. The method according to claim 1, wherein a mass ratio of the copper salt to the natural sulfide ore is 1:20 to 2:1.

5. The method according to claim 1, wherein before the natural sulfide ore is subjected to the ball-milling treatment, the natural sulfide ore is washed with a dilute acid for an impurity removal.

6. The method according to claim 1, wherein the modified natural sulfide ore material is prepared through the following specific steps:
    (1) washing a surface of the natural sulfide ore with a dilute acid to remove an oxide film and impurities, and washing the natural sulfide ore with water; drying or calcining and crushing the natural sulfide ore to obtain a crushed natural sulfide ore; and placing the crushed natural sulfide ore in a ball mill to subject to a thorough ball-milling;

(2) adding the copper salt to the ball mill, conducting a mechanical grinding for the activation to obtain a ground material, and then drying or lyophilizing the ground material, wherein a mass ratio of the copper salt to the natural sulfide ore is 1:20 to 2:1; and (3) further grinding and sieving the ground material.

7. The method according to claim 6, wherein in step (1), the dilute acid has a concentration of 1 wt % to 5 wt % and is one selected from the group consisting of a sulfuric acid, a hydrochloric acid, a nitric acid, and an acetic acid, the washing is conducted by soaking the natural sulfide ore in the dilute acid for 5 min to 20 min, the drying is conducted at 100° C. to 200° C., the calcining is conducted at 400° C. to 700° C., and the thorough ball-milling is conducted for 5 min to 30 min;

in step (2), the mechanical grinding is conducted at 25° C. to 75° C. for 5 min to 60 min, the drying is a vacuum-drying conducted at 60° C. to 150° C., and the lyophilizing is conducted at −20° C. to −40° C.; and in step (3), the further grinding is conducted for 5 min to 20 min, and the sieving is conducted until a particle size is 74 µm or less.

8. The method according to claim 2, wherein a mass ratio of the copper salt to the natural sulfide ore is 1:20 to 2:1.

9. The method according to claim 3, wherein a mass ratio of the copper salt to the natural sulfide ore is 1:20 to 2:1.

10. The method according to claim 2, wherein the modified natural sulfide ore material is prepared through the following specific steps:

(1) washing a surface of the natural sulfide ore with a dilute acid to remove an oxide film and impurities, and washing the natural sulfide ore with water; drying or calcining and crushing the natural sulfide ore to obtain a crushed natural sulfide ore; and placing the crushed natural sulfide ore in a ball mill to subject to a thorough ball-milling;

(2) adding the copper salt to the ball mill, conducting a mechanical grinding for the activation to obtain a ground material, and then drying or lyophilizing the ground material, wherein a mass ratio of the copper salt to the natural sulfide ore is 1:20 to 2:1; and (3) further grinding and sieving the ground material.

11. The method according to claim 10, wherein in step (1), the dilute acid has a concentration of 1 wt % to 5 wt % and is one selected from the group consisting of a sulfuric acid, a hydrochloric acid, a nitric acid, and an acetic acid, the washing is conducted by soaking the natural sulfide ore in the dilute acid for 5 min to 20 min, the drying is conducted at 100° C. to 200° C., the calcining is conducted at 400° C. to 700° C., and the thorough ball-milling is conducted for 5 min to 30 min;

in step (2), the mechanical grinding is conducted at 25° C. to 75° C. for 5 min to 60 min, the drying is a vacuum-drying conducted at 60° C. to 150° C., and the lyophilizing is conducted at −20° C. to −40° C.; and in step (3), the further grinding is conducted for 5 min to 20 min, and the sieving is conducted until a particle size is 74 µm or less.

12. The method according to claim 3, wherein the modified natural sulfide ore material is prepared through the following specific steps:

(1) washing a surface of the natural sulfide ore with a dilute acid to remove an oxide film and impurities, and washing the natural sulfide ore with water; drying or calcining and crushing the natural sulfide ore to obtain a crushed natural sulfide ore; and placing the crushed natural sulfide ore in a ball mill to subject to a thorough ball-milling;

(2) adding the copper salt to the ball mill, conducting a mechanical grinding for the activation to obtain a ground material, and then drying or lyophilizing the ground material, wherein a mass ratio of the copper salt to the natural sulfide ore is 1:20 to 2:1; and (3) further grinding and sieving the ground material.

13. The method according to claim 12, wherein in step (1), the dilute acid has a concentration of 1 wt % to 5 wt % and is one selected from the group consisting of a sulfuric acid, a hydrochloric acid, a nitric acid, and an acetic acid, the washing is conducted by soaking the natural sulfide ore in the dilute acid for 5 min to 20 min, the drying is conducted at 100° C. to 200° C., the calcining is conducted at 400° C. to 700° C., and the thorough ball-milling is conducted for 5 min to 30 min;

in step (2), the mechanical grinding is conducted at 25° C. to 75° C. for 5 min to 60 min, the drying is a vacuum-drying conducted at 60° C. to 150° C., and the lyophilizing is conducted at −20° C. to −40° C.; and in step (3), the further grinding is conducted for 5 min to 20 min, and the sieving is conducted until a particle size is 74 µm or less.

* * * * *